US012618727B2

(12) United States Patent
Alkhader

(10) Patent No.: US 12,618,727 B2
(45) Date of Patent: May 5, 2026

(54) SMART FABRIC IMPACT SENSORS

(71) Applicant: Arar Salim Alkhader, Easton, PA (US)

(72) Inventor: Arar Salim Alkhader, Easton, PA (US)

( * ) Notice: Subject to any disclaimer, the term of this patent is extended or adjusted under 35 U.S.C. 154(b) by 318 days.

(21) Appl. No.: 18/425,157

(22) Filed: Jan. 29, 2024

(65) Prior Publication Data

US 2025/0244184 A1 Jul. 31, 2025

(51) Int. Cl.
*G01L 1/22* (2006.01)
*A42B 3/04* (2006.01)
*G01L 5/00* (2006.01)

(52) U.S. Cl.
CPC .......... *G01L 1/2293* (2013.01); *A42B 3/0433* (2013.01); *G01L 5/0052* (2013.01)

(58) Field of Classification Search
CPC .... G01L 1/2293; G01L 5/0052; A42B 3/0433
See application file for complete search history.

(56) References Cited

U.S. PATENT DOCUMENTS

| | | | |
|---|---|---|---|
| 4,503,705 A | 3/1985 | Polchaninoff | |
| 6,993,954 B1 | 2/2006 | George et al. | |
| 9,028,405 B2 | 5/2015 | Tran | |
| 10,945,664 B1 | 3/2021 | Bozkurt et al. | |

| | | | |
|---|---|---|---|
| 2017/0273599 A1* | 9/2017 | Reese | G01L 1/142 |
| 2018/0364804 A1* | 12/2018 | Hoen | G01L 1/146 |
| 2020/0337569 A1 | 10/2020 | Tauban et al. | |
| 2024/0264012 A1* | 8/2024 | Chen | G01L 1/16 |

FOREIGN PATENT DOCUMENTS

| | | | | |
|---|---|---|---|---|
| CN | 100585352 C | 1/2010 | | |
| CN | 111473891 A | * 7/2020 | | G01L 9/12 |

* cited by examiner

*Primary Examiner* — Thomas M Hammond, III
(74) *Attorney, Agent, or Firm* — William P. Smith

(57) ABSTRACT

A force sensing device, pressure sensing matrix, and article of manufacture include resistive sensing elements. The pressure sensing matrix includes multiple force sensing devices for detecting a location of an applied force. Each force sensing device includes a resistive sensing element (RSE). The RSE includes a closed cell foam structure having a cavity for receiving a core portion. The core portion includes an open-cell foam. The core portion includes carbon black particles dispersed therein to form a semiconductive polymeric structure and piezoresistive RSE. The RSE generates a voltage signal in response to a force impacting the RSE. A conductive foil layer disposed on each of the opposing sides of the RSE for conducting the voltage signal to a conductive thread. The conductive thread is in electrical communication with the respective foil layer for transmitting voltage data to an external microprocessor device for processing.

20 Claims, 5 Drawing Sheets

SMART FABRIC IMPACT SENSORS

BACKGROUND OF THE INVENTION

The present disclosure relates to smart fabric impact sensors. More particularly the disclosure relates to smart fabric impact sensors comprising semiconductive polymer composites and applications for use of same to determine impact magnitudes and locations.

Smart Fabric Sensors (SFSs) have recently gained much interest as they are convenient as a long-term wearable that may be incorporated into apparel. In addition, SFSs feature properties such as simplicity, lightweight, low manufacturing cost, high sensitivity, and flexibility. Semiconductive polymer composites, or SCPCs, can be used as smart fabrics to create force or pressure sensors based on the piezoresistive effect. Wider application of SCPCs may be limited due to their characteristically narrow sensing range, hysteresis and output drift issues. Research studying voltage response related errors of SCPCs, particularly when applied under high impact forces, is needed.

What is needed is a system and/or method that combines the benefits of SFSs and SCPCs, satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a force sensing device. The force sensing device includes a resistive sensing element (RSE). The RSE includes a closed cell foam structure having a cavity for receiving a core portion. The core portion includes an open-cell foam. The core portion includes carbon black particles dispersed therein to form a semiconductive polymeric structure and piezoresistive RSE. The RSE generates a voltage signal in response to a force impacting the RSE. A conductive foil layer disposed on each of the opposing sides of the RSE for conducting the voltage signal to a conductive thread. The conductive thread is in electrical communication with the respective foil layer for transmitting voltage data to an external microprocessor device for processing.

Another embodiment relates to a pressure sensing matrix. The pressure sensing matrix includes multiple force sensing devices for detecting a location of an applied force. Each force sensing device includes a resistive sensing element (RSE). The RSE includes a closed cell foam structure having a cavity for receiving a core portion. The core portion includes an open-cell foam. The core portion includes carbon black particles dispersed therein to form a semiconductive polymeric structure and piezoresistive RSE. The RSE generates a voltage signal in response to a force impacting the RSE. A conductive foil layer disposed on each of the opposing sides of the RSE for conducting the voltage signal to a conductive thread. The conductive thread is in electrical communication with the respective foil layer for transmitting voltage data to an external microprocessor device for processing.

In yet another embodiment, an article of manufacture incorporating a pressure sensing matrix is disclosed. The pressure sensing matrix includes multiple force sensing devices for detecting a location of an applied force. Each force sensing device includes a resistive sensing element (RSE). The RSE includes a closed cell foam structure having a cavity for receiving a core portion. The core portion includes an open-cell foam. The core portion includes carbon black particles dispersed therein to form a semiconductive polymeric structure and piezoresistive RSE. The RSE generates a voltage signal in response to a force impacting the RSE. A conductive foil layer disposed on each of the opposing sides of the RSE for conducting the voltage signal to a conductive thread. The conductive thread is in electrical communication with the respective foil layer for transmitting voltage data to an external microprocessor device for processing.

Certain advantages of the embodiments described herein include designs of a smart fabric force sensor for wearable applications. Disclosed sensors have been shown to obtain the general characterization of their behavior through many tests and protocols for force-voltage response, linearity, hysteresis, and output drift under various loads ranging from 1 to 50 newtons (N).

A polyurethane (PU) open-cell foam impregnated with carbon black particles may serve as a resistive sensing element with a combination of other fabrics. Another advantage is a polyethylene foam with a core of carbon black PU foam resistive sensing element (RSE) layer. Still another advantage includes a polyethylene border layer with a core of carbon black polyurethane foam having a compressed RSE of extra 3 mm thickness of PU foam from both sides.

RSE sensor devices exhibit acceptable ranges compared to commercially available sensors. RSE sensors provide a wide sensing range that demonstrates reputable detection data without reaching the saturation point and without the need for any complicated or special circuitry.

The RSE sensors may be suitable for a very wide range of applications especially in sport and medical fields, advantageously deploying them not only as an impact sensor but also as means of protection.

Alternative exemplary embodiments relate to other features and combinations of features as may be generally recited in the claims.

BRIEF DESCRIPTION OF DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
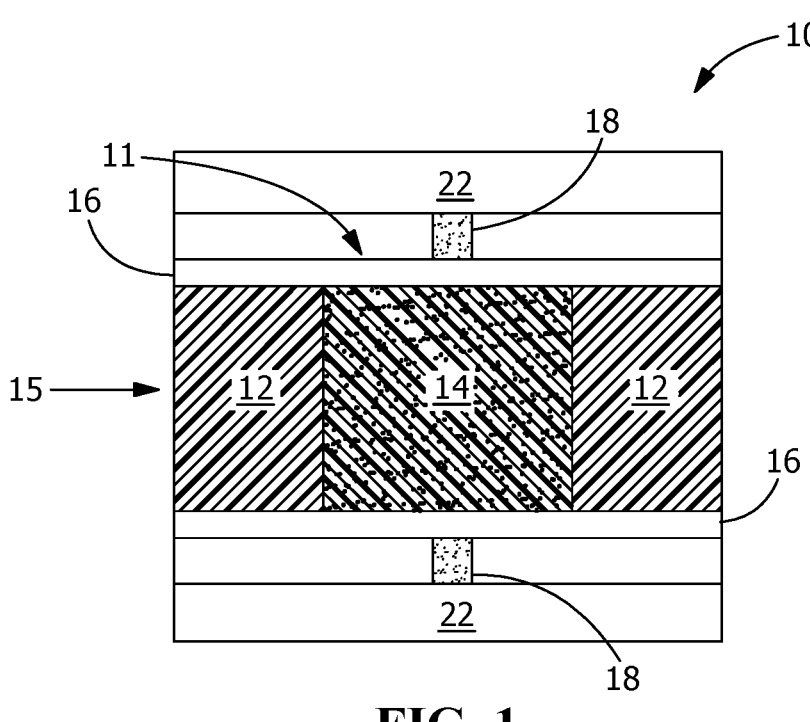
FIG. 1 is a cross-sectional view of one embodiment of a rectangular force sensor having a uniform RSE thickness.

Referring to FIG. 1, an exemplary embodiment of a force sensor module 10 is shown. Force sensor 10 includes a resistive sensing element, or RSE, 15. RSE 15 includes a laminated closed-cell Polyethylene PE foam structure 12 with a cavity 11 filled with a core portion 14. Cavity 11 is disposed in the center of PE foam structure 12. PE foam structure 12 has an outstanding dimensional stability characteristic that provides optimal cushioning and protection against repeated impacts, as well as the ability to withstand high-magnitude impacts. In a preferred embodiment the structure of the closed-cell PE foam has a higher density than core portion 14, with greater dimensional stability to strengthen foam structure 12 so as to withstand higher compression external forces compared to open-cell foams such as polyurethane foam. PE foam structure 12 also has lower moisture absorption. In an embodiment, structure 12 may preferably be lightweight and inexpensive.

Core portion 14 may be a high-density open-cell foam structure, e.g., polyethylene (PU) foam, that is impregnated with carbon black particles. The open-cell foam structure of core portion 14 with carbon black particles dispersed therein forms a semiconductive polymeric structure and piezoresistive RSE 15, which generates voltage signals in response to force impacts, as described in greater detail below. As shown in FIG. 1, core portion 14 of RSE 15 has the same thickness as PE foam structure 12. Electrode sheets 16 are disposed on opposing top and bottom sides of RSE 15. Electrode sheets 16 are composed of a conductive sheet, e.g., aluminum foil or similar material. Electrode sheets 16 cover the whole top surface and bottom surface of polyethylene foam structure 12 and PU core portion 14. Each electrode sheet 16 is connected via a conductive thread 18, directly or indirectly, to an external microcontroller unit (not shown) for processing the voltage signals generated by RSE. Thread 18 may be stainless steel wire or similar metal capable of conducting voltage signals.

In an alternate embodiment, fringe electrode structures 16 can be substituted for n conductive sheets where the conductive thread serves as an electrode in direct contact with a small portion of both sides of RSE 15 without covering the entire upper and lower surfaces. Fringe electrode structures provide flexibility for some applications that require lower sensing ability, especially for portions of the composite RSE that are not in direct contact with the electrodes. In addition, appropriate type of conductive fabrics may be used for electrode sheets 16.

Conductive thread 18 may be, e.g., a continuously drawn 3-ply 316L stainless steel conductive thread and stitched in a diagonal line of about 40 millimeters (mm) length in between aluminum foil electrode sheet 16 and an electrically insulating vinyl sheet 22 overlying each of the respective electrode sheets 16 disposed on both sides of the sensor to form opposite inclines when the sheets are disposed on the RSE 15. Vinyl sheets 22 may be comprised of, e.g., 4 mil (0.1016 mm) clear isolating vinyl sheet that covers the entire structure of RSE 15.

Without wishing to be bound by theory, an advantage of combining two foams with different compression properties, is that a PU foam is an open-cell foam that is good as a dispersed medium for carbon black particles required to create the semiconductive polymeric structure (RSE part) and it has high compressibility. Therefore, under high loads PU foam responds with maximum compression, leading to fast saturation. Fast saturation in turn limits the voltage readings into a narrow range. After a certain point the sensor reading is not reflecting the actual impact force and will give almost the same or very closed voltage readings whatever the force of the impact. Conversely polyethylene foam is a closed-cell foam which is denser and has more dimensional stability and this makes it stronger and able to withstand higher compression forces compared to PU foams. Combining both PU foam and PE foam into a singular structure allows the polyethylene foam to bear most of the load while preventing the PU foam from immediately being compressed to its maximum. Thus, the compression parameter of PU foam reflects the actual voltage readings for greater loads.

Figure 2:
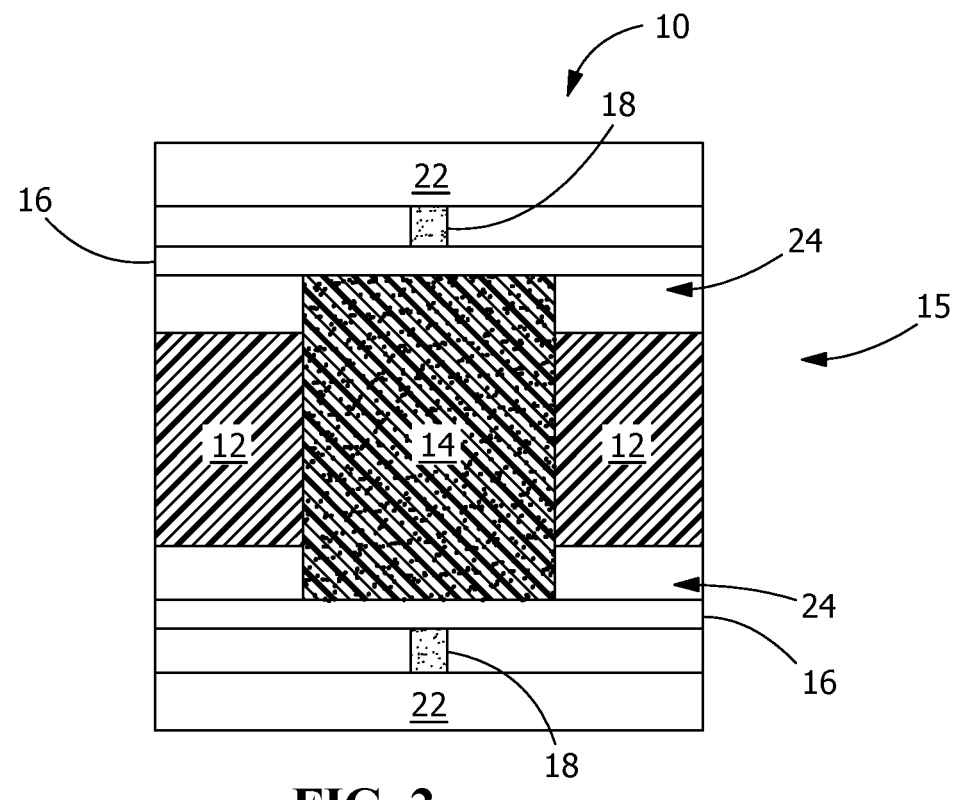
FIG. 2 shows a cross-sectional view of an alternate embodiment of a rectangular force sensor wherein the core portion of the RSE has thickness greater than the peripheral PE foam structure.

Referring next to FIG. 2, in an alternate embodiment, a force sensor 20 includes a thicker and denser amount of material. In particular, RSE 15 includes PE foam structure 12 having a more compressed, denser foam thickness, and core portion 14 is thicker than foam structure 12, such that core portion extends from top and bottom of RSE 15, and a gap 24 is created between electrode sheet 16 and RSE 15. Alternately, core portion 14 may extend only from upper RSE surface, or in another embodiment, only from bottom RSE surface. Conductive thread 18 is connected to electrode sheet 16 and insulated by insulating sheet 22, similarly to RSE in FIG. 1.

Figure 3:
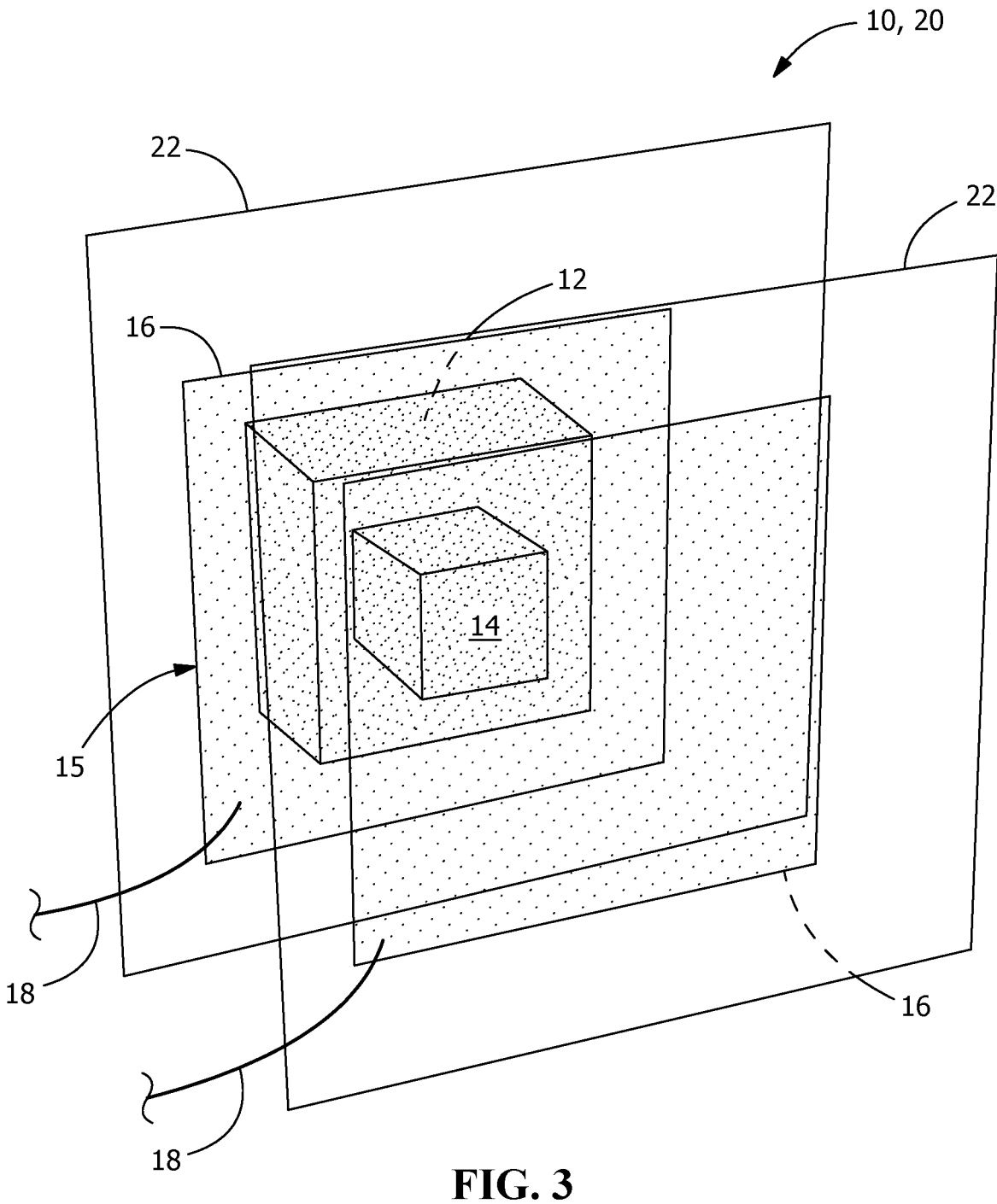
FIG. 3 shows an isometric exploded view of the force sensors of FIGS. 1 and 2.

Referring next to FIG. 3, an isometric exploded view of the force sensors 10, 20 of FIGS. 1 and 2 is shown. A pair of vinyl sheets 22 are arranged in front and behind RSE structure 15, comprising PE foam structure 12 and PU foam core 14. It should be noted that PU foam core 14, as described above with respect to FIG. 1 and FIG. 2, may be the same thickness of PE foam structure 12, or thicker than PE foam structure by up to 3 mm. (FIG. 2). Electrode sheets 16 are disposed on the inner surfaces of vinyl sheets 22.

Figure 4:
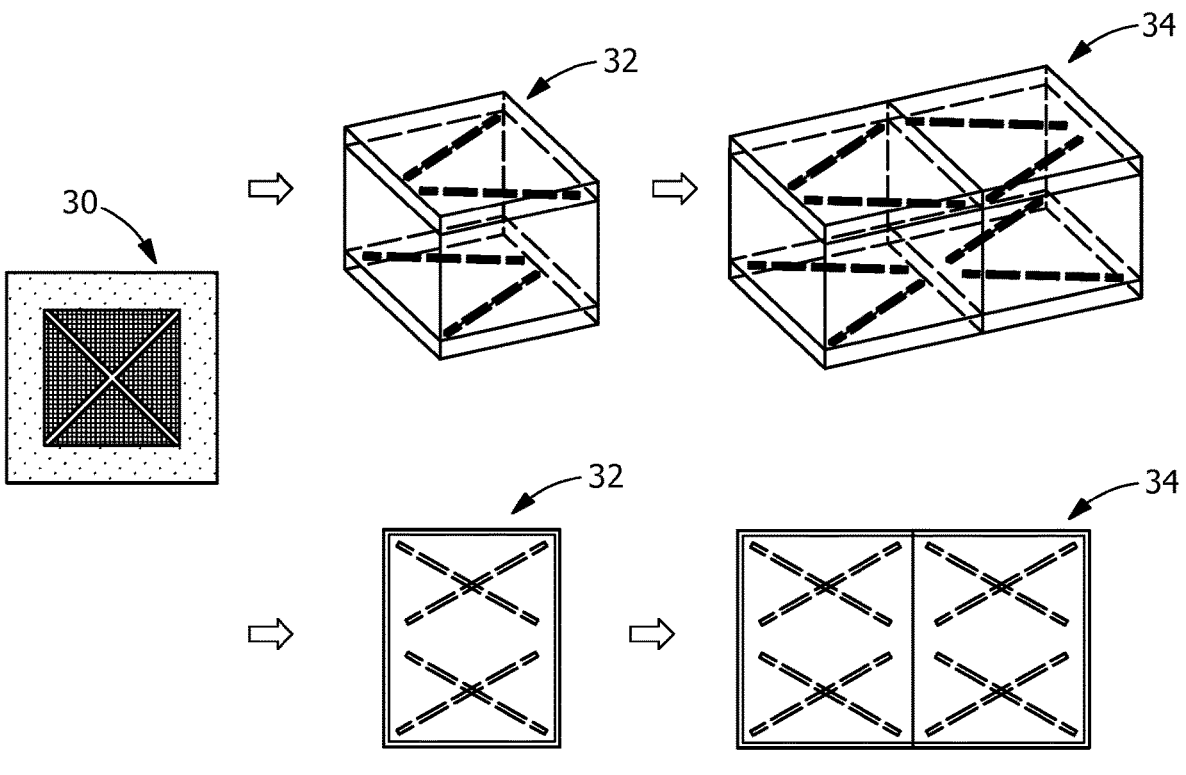
FIG. 4 shows an exemplary embodiment of one force sensor prototype using a single sensor having multi-sensing areas.

Referring next to FIG. 4, an exemplary embodiment of one force sensor array comprised of force sensors 10, 20 is shown, including an alternate embodiment of a subdivided unitary force sensor array 30 having multiple subdivided sensing areas. Force sensor array 32 has two subdivided sections, and force sensor array 34 has four subdivided sections. Top row of FIG. 4 shows sensor arrays 32, 34 in isometric view and bottom row illustrates sensor arrays 32, 34 in plan view. Each sensor array 32, 34 senses independently from one another and gives feedback about the amount and the location of the impact through its own electrodes and all together form a pressure sensing matrix.

Figure 5:
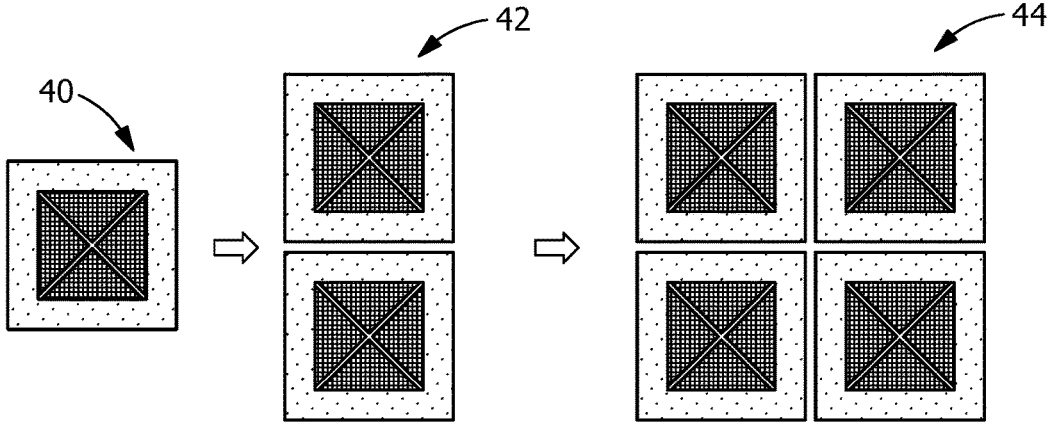
FIG. 5, shows an exemplary embodiment of an alternate force sensor as an independent sensor array using multiple force sensors.

Referring next to FIG. 5, an exemplary embodiment of an alternate force sensor array 40 is shown as an independent sensor array using multiple force sensors 10, 20. A one-by-two sensor array 42 and a two-by-two sensor array 44 are illustrated in FIG. 4, and the multi-sensor arrays 42, 44 may be extended to include an unlimited number of sensor arrays 40. Each sensor array 40 independently senses forces from other sensor arrays 40 in the array(s) 42, 44, and provides a feedback signal indicating an amount and location of an impact through its electrodes and conductive threads. In combination, sensor arrays 40 comprise the pressure sensing matrix, e.g., 42, 44.

In one exemplary embodiment conductive thread 18 may be a continuously drawn 3-ply 316L stainless steel conductive thread. Conductive thread 18 is hand-sewn as a diagonal line of about 40 mm length in between the conductive aluminum foil electrode sheets 16 and vinyl sheet 22 on opposing sides of force sensor 10, 20, to form opposite inclines when the sheets are disposed around force sensor 10, 20 structures.

This exemplary thread advantageously is strong, thin, and smooth, and easily sewn using medium-eye needles, or by sewing machines that can handle heavy threads, therefore, it is suitable for wearable and textile applications. The thread is 0.25 mm thick and made of stainless steel fibers which are highly conductive. Thread may have a low resistivity of about 0.83 Ohm/inch (10 Ohm/foot), and may drive electrical components that are responsive to a signal that is less than ~100 mA. One advantage of stainless steel is that it does not oxidize over time, thus ensuring constant conductivity and functionality of the disclosed design. Thread conductivity is not affected when washed or otherwise exposed to wet environments.

The exemplary embodiment includes a vinyl sheet 22 that is a 4 mil (0.004-inch, 0.1016 mm) thickness isolating vinyl sheet covering the whole structure 10, 20.

In the exemplary embodiment of FIG. 1, an 18 mm thickness of Polyurethane foam impregnated with carbon black particles was used as a core for the RSE part within the polyethylene structure 12. RSE structure 15 may be assembled with polyethylene foam 12 and core portion 14 of carbon black-polyurethane foam design. The polyethylene foam structure is covered by foil electrode sheets adjacent one surface of the polyethylene foam structure. Carbon black-polyurethane foam 14 is inserted withing aperture 11 of PE foam structure 12 and is housed entirely inside the polyethylene foam structure, The idea of combining two types of foam is that a PU foam is an open-cell foam that provides a dispersed medium for carbon black particles required to create the semiconductive polymeric structure, and has high compressibility. Therefore, under high loads PU foam compresses to its maximum compressibility. This maximum compression of PU foam saturates rapidly which limits the voltage readings into a narrow range of values. After a certain maximum compression point the sensor reading is not reflecting the actual impact force and will give almost the same or very closed voltage readings whatever the amount of the impact force. The surrounding PE foam 12 is a closed-cell foam which is denser than PU foam 14, and provides dimensional stability. PE foam 12 is stronger and withstands greater compression forces compared to PU foams. By combining both PE foam and PU foam in a unitary structure RSE 15 results in the PE foam 12 bearing most of the force load and at the same time prevents the PU foam core 14 from being immediately compressed to its maximum in response. Thus RSE 15 can reflect actual voltage readings in response to greater forces.

In the embodiment of FIG. 2, the same polyurethane foam material impregnated with carbon black particles comprises core portion 14 of RSE 15 within PE foam structure 12. In one exemplary embodiment core portion 14 has multiple layers compressed together with an original thickness of 30 mm before compression.

The thickness of the PU foam core portion 14 after being compressed and inserted within the polyethylene foam structure 12 is about 24 mm. The benefit of adding extra thickness of the PU foam is that the polyethylene foam is stronger and able to withstand higher compression. For low impact forces PE foam structure is not sufficiently compressed to reflect the actual readings correlated to those low impacts. PE foam structure 12 is suitable for higher impacts while for low impacts, PU foam core portion 14 is more compressible for generating a proportional voltage signal. Thus, combining both foams with a little extra PU foam thickness beyond the thickness of Polyethylene foam structure enables a wider range of impacts including light or heavy impacts.

In an embodiment the dimension of both sensors 10, 20 may be 80×80 mm$^2$.

Piezoresistive sensors quantify force by sensing the corresponding change in electrical resistance of semiconductive materials. as the only required circuit is a basic voltage divider circuit without any kind of amplification for the detected signal.

For force sensor 10, a trial has been performed for each stage of impacts. The force-voltage response resulting from the first stage testing for force-voltage relationship between 0-10 Newton (N) demonstrated a maximum difference between loading and unloading of 0.07324 at 5.88 N. For the second stage loads between 10-20 N, the force-voltage characterization yielded a maximum difference between loading and unloading of 0.20996 at 15.68 N. In the third stage loads of testing between 20-50 N, the characterization of the sensor behavior representing in force-voltage response a maximum difference between loading and unloading was found to be 0.15625 at 24.5 N.

For the force sensor embodiment 20 described above with respect to FIG. 2, trials were performed under stage 1, stage 2 and stage 3 impacts.

The force-voltage response of the three trials of stage 1 impacts demonstrated maximum difference between loading and unloading was 0.1709 at 3.92 N in one trial, 0.09277 at 2.94 N and 0.13672 at 6.86 N in 2nd and the 3rd trials respectively. For stage 2 testing the response demonstrated a maximum difference between loading and unloading of 0.19043 at 13.72 N. For stage 3 testing the maximum difference was 0.24414 at 34.3 N.

Figure 6:
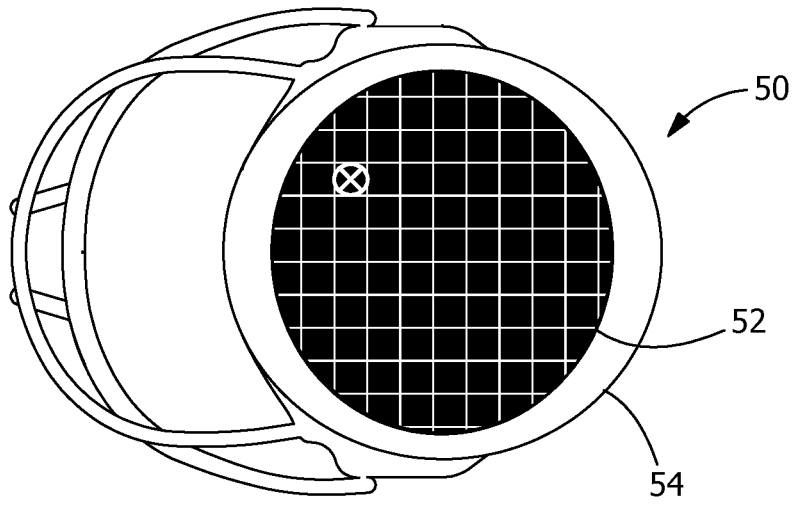
FIG. 6 shows a view of an internal view of an exemplary force sensing helmet, taken along the lines 6-6 in FIG. 7.
Figure 7:
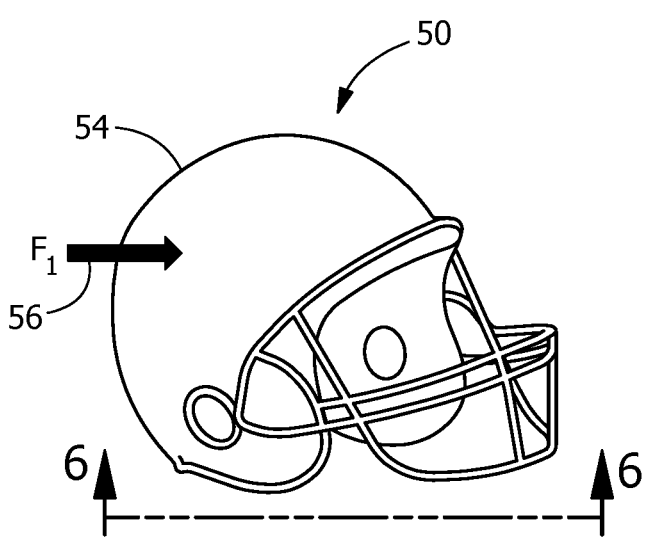
FIG. 7 shows an isometric external view of the exemplary force sensing helmet of FIG. 6, using the force sensors.

Referring next to FIG. 6, an application of the force sensors described above with respect to FIGS. 1-5 is shown, in the form of a smart helmet 50. Force sensors 10, 20 may be deployed in various applications, including but not limited to, helmets, textile fabrics, and tactile and body pressure mapping. In helmets, force sensors 10, 20 can detect high impacts. Sensors 10, 20 may be inserted within the internal padding of the helmet 50 as one fabric sheet containing a sensor matrix 52 covering the user's skull as shown in FIG. 6 and FIG. 7. An impact force $F_I$ is indicated by arrow 56 in FIG. 7.

Figure 8:
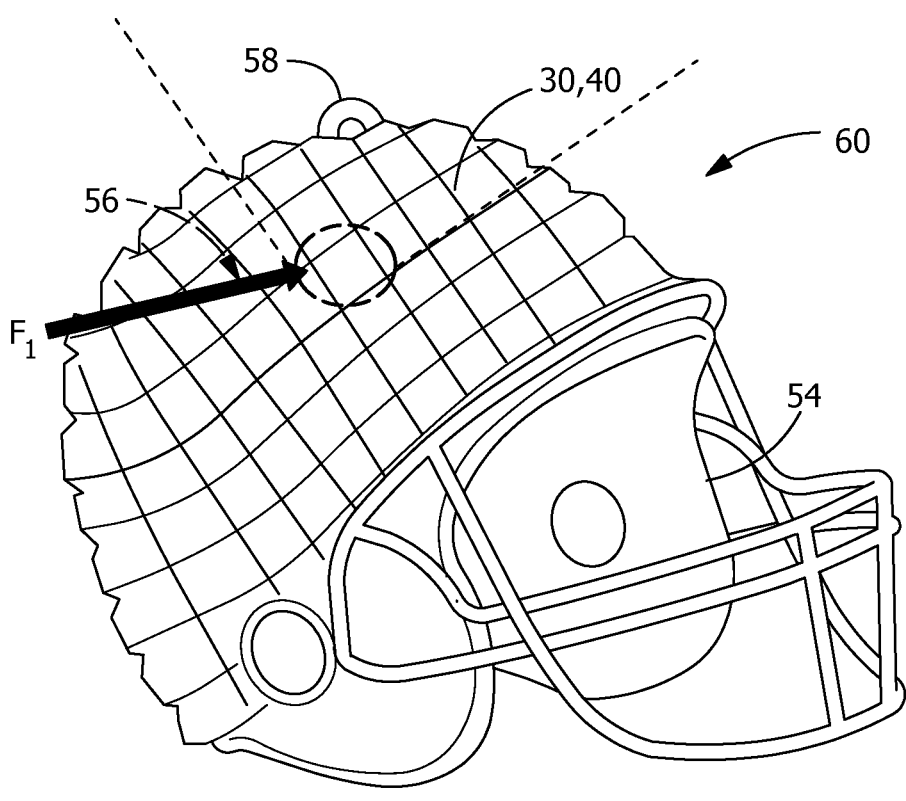
FIG. 8 shows an alternate embodiment of a force sensing helmet with the force sensors arranged on the helmet exterior.

Referring next to FIG. 8, in an alternate embodiment of a smart helmet 60 may include sensor matrix 52 comprising multi sensor arrays 30, 40, mounted externally of the helmet shell 54. Sensor arrays 30, 40 sense impact forces $F_I$ independently of each other. The helmet design for such arrangement is the mosaic pattern as shown in FIG. 8. Each sensor array 30, 40 of the sensor matrix 52 is covered by a hard intender case 58. Intender case 58 may include an optional LED (not shown) to provide certain color shades corresponding to the impact force range.

Measurement units of either meters per second squared (m/s2) or G-force (g). 1 g of acceleration is equivalent to the typical 9.8 m/s2 acceleration of gravity on earth.

Concussion occurrence depends on the load and the acceleration of that load and according to available literature it could happen at roughly 90 to 100 g-force, which equates to smashing your skull against a wall at 20 mph. G-force is a unit of force equal to the force exerted by gravity. Assuming Earth gravity of 9.806 65 meters per second squared. 1 $g_f$=0.009 806 65 N. 1 Newton: A force capable of giving a mass of one kg an acceleration of one meter per second, per second. However, the sensors were investigated in the range 1-50 N, roughly about (100-5000 gf).

While the exemplary embodiments of sensor matrix applications in FIGS. 6-8 relate to a smart helmet, it will be appreciated that the sensor matrix fabric may be adapted to other articles of manufacture for tactile and body pressure mapping, e.g., mattresses, seat belts, crash testing apparatus, military body armor, gloves and exercise attire.

One of the exemplary applications is for mattresses. When a person lies on the mattress, sensors conform to the body shape and provides a dynamic sensing of the pressure over the area covered by sensors. This enables the mattress design to improve the structures and reduce body pressure points. The polyurethane foam mattress had a higher proportion of body surface area (7.4%-14.9%) in the range of 0.6 to 1.2 psi. The disclosed sensors are mainly composed of foam and have undergone a range of pressure from 0.1 Psi to 8.0 Psi, so they can easily human body weights.

Another application of the force sensors may be realized in automobile seat belts to evaluate the contact interface between the belt and the occupant and provide a characterization of the stress points. Also, for collecting pressure on the body during impact crash testing.

Another force sensor application is in military applications, e.gl. the Tactilus® body-mapping technology used by the United State Air Force to optimize component placement on the soldier carrier system, such as: armor, ammunition clips, radios, and batteries. The devices attempt to characterize the surface pressure of the body armor on the soldier to reduce neck and shoulder strain. The tactile surface sensor pad is constructed of an array of sensor elements. Ranges can be measured between 0.1 PSI (0.007 Kg/cm$^2$) to 100 PSI (140.61 kg/cm$^2$). The Tactilus® pressure mapping system shows us any pressure points that develop, not just when soldiers stand in place but also when they perform ballistic motions, such as jumping, running quickly, turning, crouching or crawling on their bellies.

The force sensors of the present invention are very suitable for use in such military applications and devices. The forces that the disclosed sensors have been tested range from about 0.1 to 8.0 Psi, and are suitable for even higher range of force in excess of 100 due to the closed cell foam structure that is hard, flexible and compressible at the same time.

The force sensors may also be used in gloves either for just simple tactile pressure to visualize and quantify human hand interactions and finger movements and grip pressure/ force assessment, and in boxing gloves to characterize the force of a punch.

The force sensors can also be used in different kinds of wearables such as yoga leggings or any other sport exercise to provide pressure mapping along the body surface and to help the person identify the points and the amplitude of impacts at certain body parts, also in any entertaining wearables that could give a light, or sounds corresponding to an impact force.

The force sensors are very convenient for long-term exposures as they have low drift error, they can be inserted in vehicles seats, office seats, and mattresses to detect the body postures along certain duration of time such as alarming system that remind the person to take a rest or change the posture of their sitting after long time of being seated with the same position and posture.

There are many advantages of the force sensors represented in the flexibility, compressibility and also structural stability which provides main requirements to withstand high impact forces without deforming the internal structure of the resistive sensing element part and to be able to return to the original state (before undergoing the impact), the sensors also have very light weight, low manufacturing cost, the ability to be modified for any desired size and shape with any electrode design as well as they can be embedded with any number of electrical connections and wiring at any required location. One of the great benefits is that they can be used as a force sensor and as a protection mean at the same time because they are mainly foam based structure which open the gate for a very wide range of applications such as helmets, seats and vests.

The sensors are fully impermeable to water which means they are safe and would be convenient for any application requires direct contact with wet areas that could be due to sweating, humidity, or even washable application.

The force sensors can sense greater impacts and the force range can be modified to sense higher forces by increasing the thickness of the foam, or by using other types or closed-cell foam with medium compressibility to avoid fast approaching to material's maximum compression and fast saturation as well, and at the same time maintaining the ability for being compressed with the low impacts giving an accurate sensing.

Figure 9:
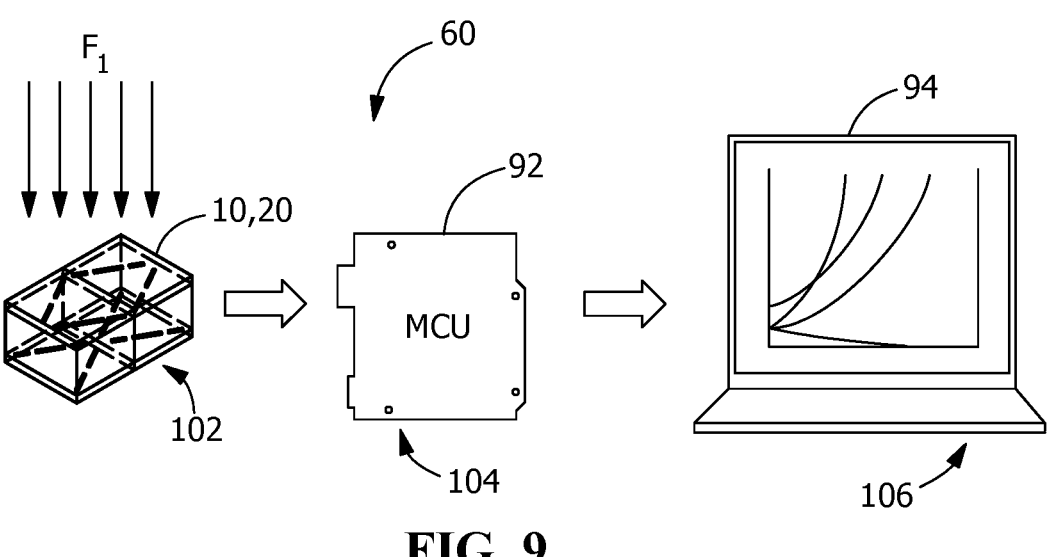
FIG. 9 shows an exemplary method for acquiring and processing data in response to force sensing signals.

Referring next to FIG. 9, an exemplary process for force sensing using the force sensors is disclosed. The force sensing process 90 includes multiple steps within the force sensing system. At step 102, process 90 begins by started applying a load, or force $F_I$ on force sensor 10, 20. Force sensor 10, 20 is connected to a microprocessor board 92, e.g., an Arduino UNO, through a voltage divider circuit at step 104. Next, data is collected as voltage readings on a computer, e.g., laptop 94 at step 106. Laptop 94 is configured for voltage data acquisition and voltage readings received in response to applied forces and correlated change in the resistance for data analysis that may be performed with custom scripts in a Microsoft Excel, or similar, spreadsheet application. E.g., one existing program is available in LabVIEW, by National Instruments. LabVIEW is configured for voltage data acquisition before ending with an Excel sheet script. Laptop 94 may be a computing device, e.g., personal computer, server, or special purpose computer.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the smart fabric impact sensors, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general-purpose computer, special purpose computer, or special purpose processing machines to perform a certain function or group of functions.

The invention claimed is:

1. A force sensing device comprising:
a resistive sensing element (RSE), the RSE comprising:
a closed cell foam structure having a cavity for receiving a core portion;
the core portion comprising an open-cell foam having carbon particles impregnated therein;
the core portion comprising carbon black particles dispersed therein to form a semiconductive polymeric structure and piezoresistive RSE, the RSE generating a voltage signal in response to a force impacting the RSE; and
a conductive foil layer disposed on each of an opposing side of the RSE for conducting the voltage signal to a conductive thread, the conductive thread in electrical communication with the respective foil layer for transmitting a voltage data to an external microprocessor device for processing.

2. The force sensing device of claim 1, wherein the closed-cell foam structure comprises a laminated polyethylene PE foam structure.

3. The force sensing device of claim 1, wherein the cavity being disposed in a center of the closed-cell foam structure.

4. The force sensing device of claim 1, wherein the core portion comprises a polyethylene (PU) foam structure.

5. The force sensing device of claim 4, wherein the core portion further comprises a semiconductive polymeric structure.

6. The force sensing device of claim 1, wherein the closed-cell foam structure having a first thickness, and the core portion having a second thickness.

7. The force sensing device of claim 6, wherein the first thickness is the same as the second thickness.

8. The force sensing device of claim 6, wherein the second thickness is greater than the first thickness.

9. The force sensing device of claim 8, wherein the core portion having the second thickness extends above at least one surface of the closed cell foam, the core portion forming a gap between the conductive foil layer and the RSE.

10. A pressure sensing matrix comprising a plurality of force sensing devices for detecting a location of an applied force;
each force sensing device of the plurality of force sensing devices comprising:
a resistive sensing element (RSE), the RSE comprising:
a closed cell foam structure having a cavity for receiving a core portion;
the core portion comprising an open-cell foam having carbon particles impregnated therein;
the core portion comprising carbon black particles dispersed therein to form a semiconductive polymeric structure and piezoresistive RSE, the RSE generating a voltage signal in response to a force impacting the RSE; and
a conductive foil layer disposed on each of an opposing side of the RSE for conducting the voltage signal to a conductive thread, the conductive thread in electrical communication with the respective foil layer for transmitting a voltage data to an external microprocessor device for processing.

11. The pressure sensing matrix of claim 10, wherein the pressure sensing matrix comprising a plurality of force sensing devices arranged in subdivided areas;
wherein each force sensing device senses the force independently from another force sensing device of the plurality of force sensing devices; each force sensing device generating a voltage response to the sensed force and detects the amount and the location of the force through the respective conductive thread.

12. The pressure sensing matrix of claim 10, wherein the pressure sensing matrix comprising a plurality of independent force sensing devices, sensor array; wherein
each force sensing devices of the plurality of independent force sensing devices senses the force independently of other sensors in the pressure sensing matrix, and provides a feedback signal indicating an amount and location of the force through the respective one of the foil layers via conductive threads in electrical communication with other force sensing devices of the pressure sensing matrix.

13. The pressure sensing matrix of claim 11, wherein the conductive thread comprises a continuously drawn 3-ply stainless steel conductive thread.

14. The pressure sensing matrix of claim 12, wherein the conductive thread is hand-sewn between the conductive foil layer and an electrically insulating sheet on opposing sides of force sensor.

15. An article of manufacture comprising a pressure sensing matrix, comprising:

a plurality of force sensing devices;

each force sensing device of the plurality of force sensing devices comprising:

a resistive sensing element (RSE), the RSE comprising:

a closed cell foam structure having a cavity for receiving a core portion;

the core portion comprising an open-cell foam having carbon particles impregnated therein;

the core portion comprising carbon black particles dispersed therein to form a semiconductive polymeric structure and piezoresistive RSE, the RSE generating a voltage signal in response to a force impacting the RSE; and a conductive foil layer disposed on each of an opposing side of the RSE for conducting the voltage signal to a conductive thread, the conductive thread in electrical communication with the respective foil layer for transmitting a voltage data to an external microprocessor device for processing.

16. The article of manufacture of claim 15, wherein the article of manufacture comprises a helmet; and a fabric sheet comprising the pressure sensing matric and being interconnected via conductive thread;

the fabric sheet attached to a surface of the helmet.

17. The article of manufacture of claim 16, wherein the fabric sheet being mounted externally of the helmet; and wherein the force sensing devices sense one or more forces independently of other force sensing devices of the pressure sensing matrix.

18. The article of manufacture of claim 16, wherein the fabric sheet being inserted within an internal padding of the helmet; and wherein the force sensing devices sense one or more forces independently of other force sensing devices of the pressure sensing matrix.

19. The article of manufacture of claim 16, wherein each force sensing device of the plurality of force sensing devices further comprises a hard intender case covering the force sensing device; and an LED to provide a color shade corresponding to an impact force range.

20. The article of manufacture of claim 15, wherein the article of manufacture being selected from one of the group consisting of: textile fabric and tactile mapping material; body mapping material; mattress, seat belt, crash testing apparatus, military body armor, gloves and exercise attire.

* * * * *